United States Patent
Hazan

(10) Patent No.: US 10,902,513 B1
(45) Date of Patent: Jan. 26, 2021

(54) DEBIT-BASED MICROLOAN FINANCING

(71) Applicant: Tamir Hazan, Zichron Ya'acov (IL)

(72) Inventor: Tamir Hazan, Zichron Ya'acov (IL)

(73) Assignee: SUNBIT, INC., Los Angeles, CA (US)

( * ) Notice: Subject to any disclaimer, the term of this patent is extended or adjusted under 35 U.S.C. 154(b) by 369 days.

(21) Appl. No.: 15/585,086

(22) Filed: May 2, 2017

(51) Int. Cl.
*G06Q 40/00* (2012.01)
*G06Q 40/02* (2012.01)
*G06Q 20/10* (2012.01)
*G06Q 20/20* (2012.01)

(52) U.S. Cl.
CPC ......... *G06Q 40/025* (2013.01); *G06Q 20/102* (2013.01); *G06Q 20/20* (2013.01)

(58) Field of Classification Search
CPC ..... G06Q 40/025; G06Q 20/102; G06Q 20/20
USPC ..................................... 705/35–40
See application file for complete search history.

(56) References Cited

U.S. PATENT DOCUMENTS

| | | | | |
|---|---|---|---|---|
| 8,521,631 B2* | 8/2013 | Abrahams | ............ | G06Q 40/00 705/36 R |
| 8,738,451 B2* | 5/2014 | Ahlers | ................... | G06Q 20/10 705/17 |
| 2005/0211765 A1* | 9/2005 | Brown | ................ | G06Q 20/102 235/379 |
| 2006/0293983 A1* | 12/2006 | Rosenblatt | ............ | G06Q 40/00 705/35 |
| 2008/0235153 A1* | 9/2008 | Tombs | ................... | G06Q 40/00 705/36 R |
| 2009/0287575 A1* | 11/2009 | Galit | ..................... | G06Q 20/10 705/16 |
| 2014/0006129 A1* | 1/2014 | Heath | ............... | G06Q 30/0222 705/14.23 |
| 2015/0269671 A1* | 9/2015 | Garrity | ................. | G06Q 40/02 705/38 |
| 2016/0048839 A1* | 2/2016 | Cherry | ............ | G06Q 20/40145 705/44 |
| 2017/0161717 A1* | 6/2017 | Xing | .................. | G06Q 20/3274 |
| 2018/0300708 A1* | 10/2018 | Dar | ........................ | G06Q 20/42 |

FOREIGN PATENT DOCUMENTS

JP    2003108763 A  *  4/2003

OTHER PUBLICATIONS

Sadique: "Secure Mobile POS System—point of sale application for secure financial transitions in a mobile business enviroment", Master of Science Thesis, KTH Royal Institute of Technology, Stockholm, Sweden (Year: 2013).*

* cited by examiner

*Primary Examiner* — Edward J Baird
(74) *Attorney, Agent, or Firm* — Foley & Lardner LLP

(57) ABSTRACT

Methods, systems, and apparatuses, including computer programs encoded on computer-readable media are disclosed for processing microloans. A network-enabled microloan computing system receives microloan applications that include identifying customer information and a desired loan amount. Information relating to the risks of issuing a microloan to a subject customer is collected and used to generate at least one microloan option containing a set of microloan terms. The customer can select among available microloan options and provide debit card information to the microloan computing system, at which point the microloan computing system can authorize the selected microloan to issue.

17 Claims, 7 Drawing Sheets

DEBIT-BASED MICROLOAN FINANCING

FIELD

The present disclosure generally relates to consumer financing.

BACKGROUND

Some consumer goods at a price point between small-ticket items (e.g., groceries, basic tools, consumable supplies, and so on) and big-ticket items (e.g., cars, recreation vehicles, real estate, and so on) can be too expensive to purchase outright with cash, and yet not of sufficient value to purchase through traditional financing. As a result, a customer in the market for such a middle-ticket item may be faced with a number of undesirable prospects, including paying a prohibitive amount of cash up front, undergoing a lengthy approval process for a personal loan with a substantial interest rate, financing the purchase with a high-APR credit card, or simply not being able to purchase the item at all.

SUMMARY

One embodiment relates to a microloan computing system. The system includes a network interface logic configured to access and exchange data over a network. The system further includes a microloan processing logic. The microloan processing logic is configured to receive a microloan application including identifying customer information of a customer and a loan amount. The microloan processing logic is further configured to collect customer data relating to the customer from at least one customer data source. The microloan processing logic is configured to generate at least one microloan option containing microloan terms based on the customer data and the loan amount. The microloan processing logic is further configured to receive debit card information corresponding to an account at a financial institution to be used for providing payments pursuant to a selected microloan option. The microloan processing logic is configured to authorize a microloan based on the selected microloan option to issue, wherein the microloan is repaid from the account.

Another embodiment relates to a computer-implemented method. The method includes receiving, by a microloan processing logic, a microloan application including identifying customer information of a customer and a loan amount. The method further includes collecting, by a microloan processing logic, customer data relating to the customer from at least one customer data source. The method includes generating, by a microloan processing logic, at least one microloan option containing microloan terms based on the customer data and the loan amount. The method further includes receiving, by a microloan processing logic, debit card information corresponding to an account at a financial institution to be used for providing payments pursuant to a selected microloan option. The method includes authorizing, by a microloan processing logic, a microloan based on the selected microloan option to issue, wherein the microloan is repaid from the account.

Yet another embodiment relates to a non-transitory computer readable media having computer-executable instructions embodied therein that, when executed by at least one processor of a microloan computing system, cause the microloan computing system to perform operations. The operations include receiving a microloan application including identifying customer information of a customer and a loan amount. The operations further include collecting customer data relating to the customer from at least one customer data source. The operations include generating at least one microloan option containing microloan terms based on the customer data and the loan amount. The operations further include receiving debit card information corresponding to an account at a financial institution to be used for providing payments pursuant to a selected microloan option. The operations include authorizing a microloan based on the selected microloan option to issue, wherein the microloan is repaid from the account.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE FIGURES

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Figure 1:
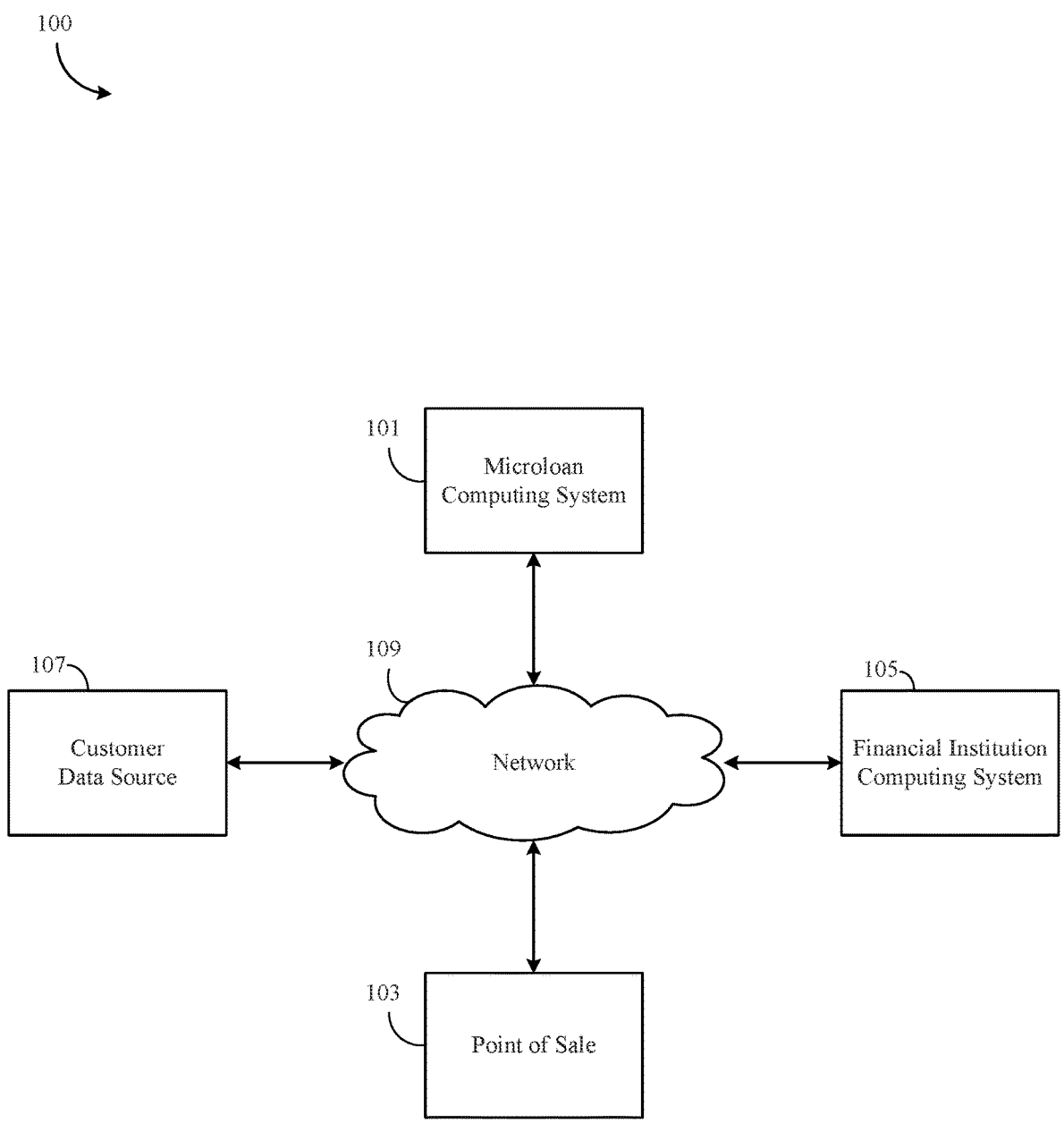
FIG. 1 is a schematic diagram of a computer-implemented, debit-based microloan financing system according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Referring to the figures generally, systems and methods for providing debit-based microloan financing for consumer goods or services at a point of sale are described. While many commercial vendors traditionally offer in-house financing or branded lines of credit for purchasing goods or services where up-front cash payment may not be desirable or possible, those purchasing options generally entail inconvenient approval processes and steep interest rates. In contrast, the methods and systems disclosed herein provide a fast and efficient approach to offer, underwrite, and process microloans in a manner that reduces risk to the lender, and thus lowers interest rates for the borrower. In the context of the present disclosure, microloans are limited term, purchase financing arrangements involving a modest sum of cash (e.g., a loan of $300.00 over a term of three months, a loan of $1,200.00 over a term of twelve months, or the like). Customers can use microloans at points of sale to purchase any of a variety of consumer goods or services that may not be traditionally financed, including for example, appliances, furniture, clothing, electronics, and so on.

Referring now to FIG. 1, a computer-implemented, debit-based microloan financing system 100 includes a microloan computing system 101, a point of sale 103, a financial institution computing system 105, a customer data source 107, and a network 109. The microloan computing system 101 provides microloans at the point of sale 103, thereby allowing customers to procure financing at the time of purchase. In operation, a customer identifies a desired good to purchase at the point of sale 103 and a user (e.g., a clerk, customer service representative, etc.) transmits a microloan application to the microloan processing system 101. The microloan computing system 101 receives the microloan application from the point of sale 103, and accesses one or several customer data sources 107 and the financial institution computing system 105 via the network 106. The microloan computing system 101 compiles information relating to the customer's financial status, and generates one or several microloan options based on a risk assessment derived from the customer's financial status. The microloan options are presented to the customer, who may accept one of the options and swipe a debit card at the point of sale 103. The customer's checking account associated with the debit card may then be tied to the chosen microloan, which can be managed by the microloan computing system 101 for the life of the microloan. The microloan computing system 101 causes a payment to be made in full (e.g., from an account associated with a microloan servicer) to the vendor associated with the point of sale 103, and the customer can be immediately entitled to the subject good or service. The features, functions, and the relationships between the various aspects of system 100 are described in further detail below.

Figure 2:
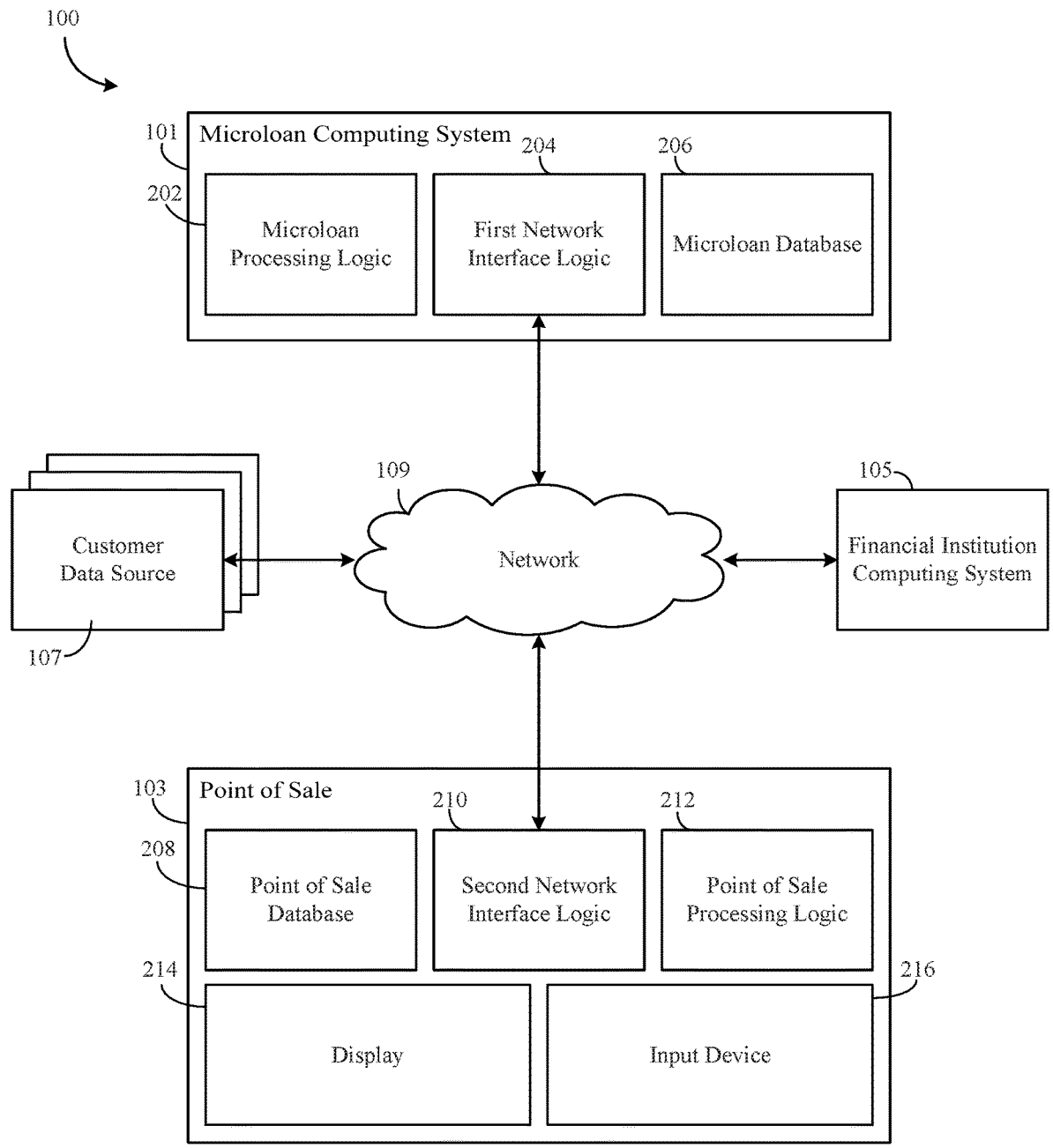
FIG. 2 is another schematic diagram of the computer-implemented, debit-based microloan financing system shown in FIG. 1.

Referring now to FIG. 2, the network 109 is a medium through which a plurality of computing systems can communicate, which include wireless networks (e.g., cellular networks, Bluetooth®, WiFi, Zigbee®, etc.), wired networks (e.g., Ethernet, DSL, cable, fiber-based, etc.), or combinations thereof. Computing systems may be configured to exchange information via one or more interface logics that enable associated computing systems to communicate over a given network 109 (e.g., first network interface logic 204 and second network interface logic 210). In some arrangements, the network 109 includes the internet.

The customer data source 107 comprises one or more sources of financial or personal data that ultimately gives rise to a risk assessment of issuing a microloan to a given customer. Each customer data source 107 may comprise one or several computer systems that are collectively able to exchange information relating to the creditworthiness of a given customer over the network 109. Examples of a customer data source 107 include third party vendors such as Microbilt Corp. or Lexis-Nexis™, who provide personal or financial reporting services (e.g., background checks, credit checks, financial judgments on record, and so on). In some arrangements, the customer data source 107 can return risk assessment information using a limited amount of customer identifying information, for example, only the information present on a driver's license (e.g., full name, mailing address, driver's license number, and so on). In some such arrangements, the customer data source 107 may need the last four digits of a customer's social security number on top of the information present on the customer's driver's license. In some arrangements, the customer data source 107 includes one or more financial institutions where a subject customer maintains at least one account. Further, in some arrangements, the customer data source 107 can be accessed by the microloan computing system 101 over the network 109.

The financial institution computing system 105 is a computing system at a financial institution that manages customer accounts. The financial institution is capable of maintaining customer checking accounts and facilitating customer purchases (e.g., by transferring funds from a customer's checking account to a microloan servicer), and may include commercial or private banks, credit unions, or investment brokerages. Financial institutions offer a variety of financial services, including savings and checking accounts, various lines of credit, investment vehicles, bill pay services, and so on, many of which can be maintained and provided by the financial institution computing system 105.

The financial institution computing system 105 is configured to maintain customer checking accounts or other accounts associated with financial institution-issued debit cards. Debit cards contain identifying customer information, including account information corresponding to, for example, a customer's checking account at a financial institution. In some arrangements, the debit card is a physical item (e.g., constructed from plastic or metal) with a customer name and an account number corresponding to a customer checking account. In other arrangements, the debit card is a digital file with a customer name and account number, which can be transmitted electronically (e.g., via a smartphone, from a data storage cloud, a personal computer, or the like). In yet other arrangements, the debit card is a digital file in a storage device that can be retrieved from an external receiver (e.g., a fob, an NFC reader, a "chip" in the context of a chip and pin machine, a USB storage device, or the like). A customer can use a debit card at the point of sale 103 to cause a direct transfer of cash assets from the customer's checking account at the financial institution to an account associated with the vendor, or here, to a microloan servicer (e.g., microloan computing system 101). The financial institution computing system 105 can exchange information over the network 109, and may be accessed by the microloan computing system 101.

The point of sale 103 is a computing system at a vendor of goods or services. The point of sale 103 is configured to facilitate customer purchases at a vendor, including purchases made via microloans. The point of sale 103 includes a point of sale database 208, a second network interface logic 210, a point of sale processing logic 212, a display 214, and an input device 216. In one arrangement, the point of sale database 208 includes product and/or service information provided by a given vendor, such as quantity of units available, price, and so on. The point of sale database 208 may also include information relating to current customers, including purchase histories, membership to loyalty programs, previous methods of payment, and so on. The second network interface logic 210 is configured to enable the point of sale 103 to exchange information to other computing systems over the network 109.

The display 214 and the input device 216 are the devices that provide outputs and inputs, respectively, for a user of the point of sale 103. The display 214 is configured to interpret data from the point of sale processing logic 212 and provide output information to a user in the form of images, video, or other visual media. The display 214 can include any of several types of devices, including LCD, LED, CRT, plasma, or other such digital displays, projection-based monitors, touchscreens, and so on. In some arrangements, the display 214 is included in a smartphone. The input device 216 is configured to receive external input provided by a user at the point of sale 103 and convert the input into digital signals to be received at the point of sale processing logic 212. The input device 216 can also include any or a combination of any of several devices, including keyboards, mice, touchscreens, register keys, scanners (e.g., for barcodes, PDF417 codes, QR codes, and so on), card or proximity readers (e.g., a debit or credit card reader, a chip reader, mobile phone-based proximity readers, and so on).

The point of sale processing logic 212 facilitates financial transactions incidental to the purchase of consumer goods or services. In some arrangements, the point of sale processing logic 212 interfaces with each of the components of the point of sale 103, and causes exchanges of information over the network 109 to occur via the second network interface logic. For example, in operation, the point of sale processing logic 212 can receive identifying product information from the input device 216 (e.g., as read by an input device 216 in the form of a bar code scanner), identify and retrieve an associated price from the point of sale database 208, and cause the display 214 to inform a user of the product name, price, and quantity available. The point of sale processing logic 212 can also receive customer payment information from the input device 216 (e.g., from an input device 216 in the form of a card reader), and transmit a transaction request over the network 109 via the second network interface logic 210 (e.g., to the financial institution computing system 105 or the microloan computing system 101). In addition, the point of sale processing logic 212 can transmit microloan applications to the microloan computing system 101 to facilitate a customer purchase via a microloan transaction.

The microloan computing system 101 is configured to underwrite and process microloan applications, and may also be configured to service and monitor existing microloans. The microloan computing system 101 includes a microloan processing logic 202, a first network interface logic 204, and a microloan database 206. In some arrangements, the microloan computing system 101 is configured to communicate with the point of sale 103 via the network 109. In some such arrangements, the microloan computing system 101 is integrated with and disposed at the financial institution computing system 105. In other such arrangements, the microloan computing system 101 is an independent computing system (i.e., not physically located at the financial institution computing system 105 or the point of sale 103). In other arrangements, the microloan computing system 101 is integrated with and disposed at the point of sale 103, and as such, can exchange data with the point of sale 103 on a local level.

The microloan database 206 includes information on customers with existing microloans and pending microloan applications. In some arrangements, the microloan database 206 further includes information on customers who have previously had microloans or who have previously applied for microloans. The information in the microloan database 206 can include, for example, identifying customer information (e.g., name, address, phone number, and so on), associated debit card information, and risk assessment information derived from the customer data source 107. The first network interface 204 is configured to enable the microloan computing system 101 to exchange information to other computing systems over the network 109.

The microloan processing logic 202 is configured to underwrite microloan applications, generate microloan options, and in some arrangements, service existing microloans. In the context of the present disclosure, a microloan application includes a request for a microloan of a specified amount and identifying customer information. In some arrangements, the microloan application is transmitted to the microloan computing system 101 from the point of sale 103. The microloan processing logic 202 underwrites a given microloan application by using the identifying customer information in the application to generate a risk assessment of granting a microloan to that customer. The risk assessment includes various types of customer financial data, for example, information relating to a customer's credit score, outstanding judgments, account balances, and so on. The information underlying the risk assessment can be derived from the customer data source 107, which as discussed above, may include one or more financial institutions or third-party vendors.

In some arrangements, the risk assessment includes a risk score calculated from the information received from the customer data source 107. In some such arrangements, the risk score is an incremental measure that can be used to gauge the risk on an absolute scale (e.g., a numerical score ranging from 1 to 100, wherein the risk score is calculated irrespective of other microloan applicants). In other such arrangements, the risk score is on a relative scale (e.g., an alphabetical score ranging from A to F, wherein each letter designates the risk of a particular group of applicants relative to the rest of the applicants, such as being in the top 20% of risk for one score, the next 21-50% group for another score, and so on). In some arrangements, the risk score does not include an actual alphabetical or numerical value, but the risk score still provides a measure of risk in a similar manner.

In some arrangements, the underwriting process includes the application of customer data source 107 information to a risk algorithm, such as a series of decision trees. For example, the outcome of each fork in a given decision tree can be based on a particular data point from a customer data source 107 (e.g., whether the customer has a particular minimum balance in a checking account, whether the customer has a minimum threshold credit score, and so on), and each associated branch can be indicative of an increased or decreased level of risk. The decision trees can be generated by any of a variety of designs, including boosting decision trees, random forests, support vector machines, logistic regression, deep learning, and so on, and may range from very simple (e.g., a handful of forks) to very complex (e.g., tens or hundreds of forks). As a result of applying customer information from the customer data source 107 to a given decision tree, a risk assessment of providing a microloan to that customer can be generated. In some arrangements, a given algorithm or decision tree produces a risk score.

The microloan processing logic 202 generates one or more microloan options based on the risk assessment generated during the underwriting process. Each microloan option includes a set of microloan terms. Microloan terms define a given microloan, giving rise to a series of cash payments over a length of time. Microloan terms can include, for example, a principal value, an interest rate, a number of payments to be made, and a time interval separating each payment (e.g., a principal of $300 at 10% interest with payments due at the first of each month for five months). In some arrangements, the microloan processing logic 202 generates microloan options with increasing interest rates and/or decreasing repayment time periods with increasing levels of customer risk. For example, the microloan processing logic 202 may generate microloan options with repayment periods of up to twelve months for a customer whose risk assessment includes a low risk score. On the other hand, the microloan processing logic 202 may only generate microloan options with repayment periods of four months or less for a customer whose risk assessment includes a high risk score. The determination of loan repayment periods may be determined in various ways for example, on a sliding scale (e.g., any term of months from one to twenty-four months), or in increments (e.g., a three month term for customers associated with a range of high risk scores, a six month term for customers associated with a middle range of risk scores, and a twelve month term for customers associated with a low range of risk scores). Similar determinations can be made for various microloan terms.

The microloan processing logic 202 causes microloans to issue. In some arrangements, the microloan processing logic 202 causes a microloan to issue after a customer selects one of the generated microloan options and transmits debit card information to the microloan computing system 101 (e.g., via the input device 216 at the point of sale 103). In one such arrangement, the microloan processing logic 202 attempts to match the debit card information with previously received identifying customer information as a continuing risk assessment step (i.e., as one of the forks of a corresponding risk assessment decision tree). Alternatively, the microloan processing logic 202 can request a customer PIN number in addition to the debit card information to confirm the customer's identity. In addition, in one arrangement, the microloan processing logic 202 can be configured to draw a first microloan payment from the checking account or other account associated with the debit card and apply the payment to the initial microloan balance as another risk assessment step. As such, in one such arrangement, if the debit card information does not match the identifying customer information, or if a checking account associated with the debit card does not have sufficient funds for the first microloan payment, the microloan processing logic 202 can determine that the risk of issuing a microloan to the customer is too high and decline the microloan application. On the other hand, if the debit card information matches and the checking account has sufficient funds, the microloan processing logic 202 can issue the microloan by, for example, transmitting a final approval to the point of sale 103 and issuing a payment of the microloan principal in full to the associated vendor. Once a microloan is issued, the vendor is paid in full and the customer can be immediately entitled to the good or service at hand.

The microloan processing logic 202 can be configured to service issued microloans by drawing payments from customer accounts at a financial institution at particular intervals. In one arrangement, the microloan processing logic 202 draws payments from the customer checking account associated with the debit card that the customer used to secure the microloan. As such, the microloan can be tied to a particular debit card and therefore to a particular checking account, and the microloan processing logic 202 can automatically withdraw payments for the life of the microloan without further input from the customer.

Figure 3A:
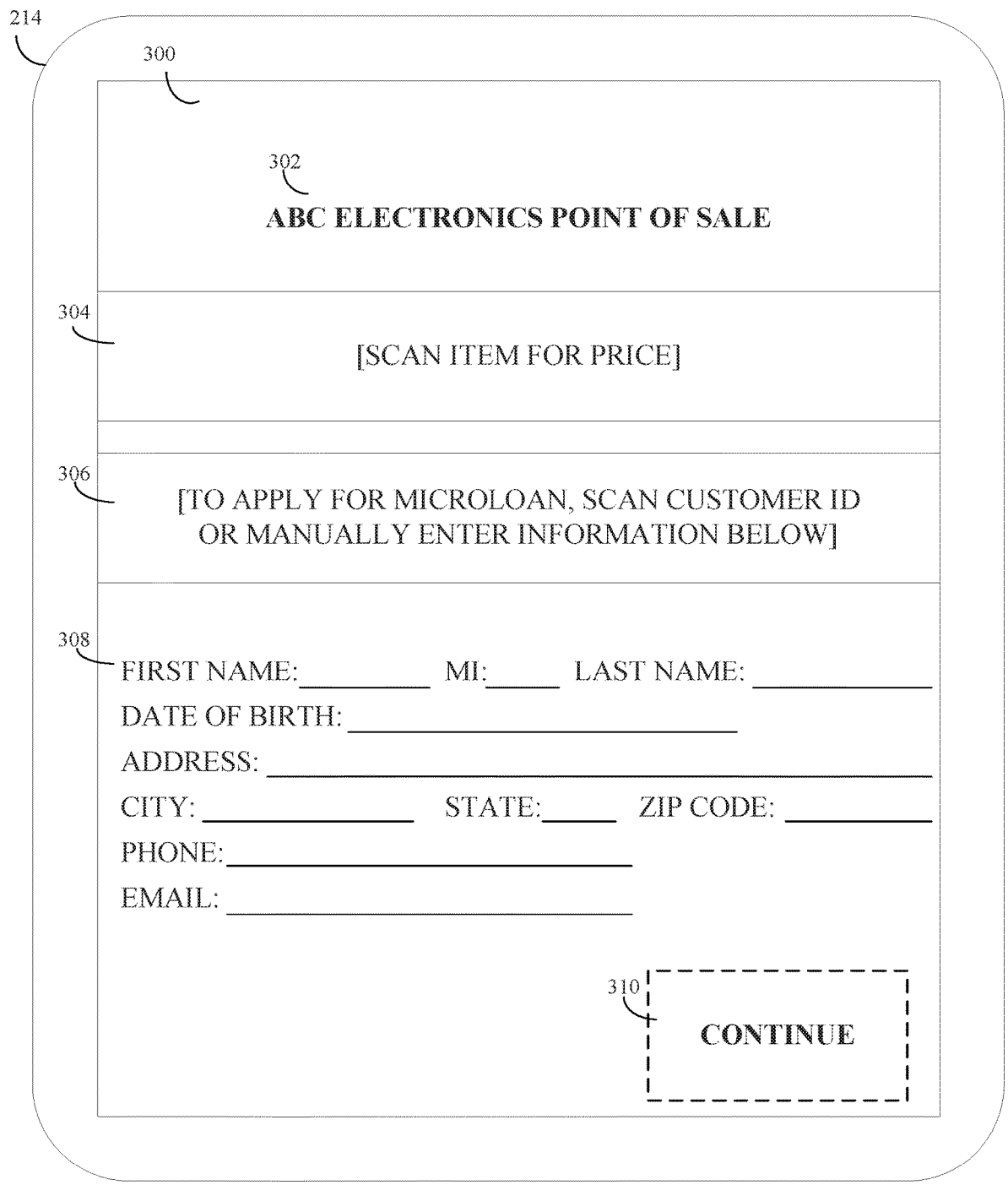
FIG. 3A is an illustrative diagram of a user interface on a point of sale according to an example embodiment.

Referring now to FIG. 3A, an example interactive graphical user interface 300 as viewed on the display 214 of a point of sale (e.g., point of sale 103) is shown according to an example embodiment. The graphical user interface 300 facilitates customer purchases of goods or services at a vendor, and is a visual output of various functions performed by components of a point of sale 103 (e.g., as discussed with respect to FIG. 2, above) that a user can perceive on the display 214. The graphical user interface 300 includes a title 302, a first instruction 304, a second instruction 306, customer information fields 308, and a progress trigger 310.

The title 302 informs a user of the graphical user interface 300 that the available operations underlying the graphical user interface 300 relate to a point of sale. The first instruction 304 and the second instruction 306 inform the user of the available actions that may be taken at the current stage of the graphical user interface. Here, the first instruction 304 indicates that the point of sale is prepared to receive identifying product information (e.g., product information that can be scanned in via bar code scanner, manually entered via a keyboard or touchscreen, or the like). The second instruction indicates that the point of sale is configured to generate microloan applications, which can be initiated by entering customer information into the available customer information fields 308 (e.g., via scanning a customer identification card such as a driver's license or a state identification license, or by manually entering customer information via a keyboard or a touchscreen, or the like).

The progress trigger 310 indicates that a subsequent screen of the graphical user interface 300 will be available. Implicit in the current screen (i.e., by the dashed outline of the progress trigger 310) is that the subsequent screen will not be available until at least product information is entered into the point of sale. In arrangements where the display 214 and corresponding input device (e.g., input device 216) is a touchscreen display, a user may be able to physically interact with the progress trigger 310 and the customer information fields 308 to enter information and cause the graphical user interface to advance.

Figure 3B:
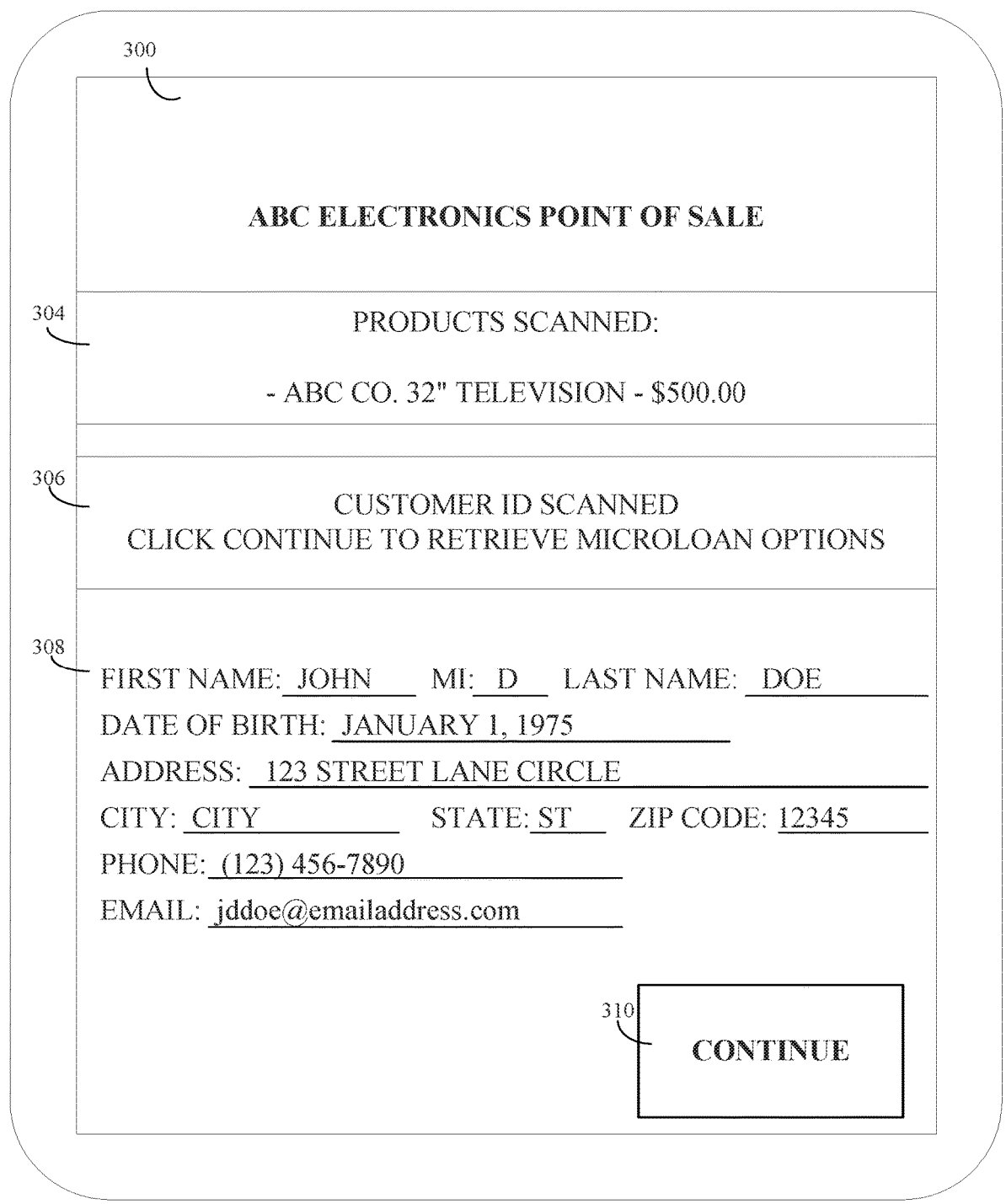
FIG. 3B is an illustrative diagram of a user interface on a point of sale of FIG. 3A having user data added according to an example embodiment.

Referring now to FIG. 3B, the graphical user interface 300 has been updated to reflect information entered in response to the first instruction 304 and the second instruction 306. With respect to the first instruction, product and price information is now shown (e.g., as retrieved from a point of sale database 208 via the point of sale processing logic 212 in response to information being entered into an input device 216). With respect to the second instruction, the customer information fields 308 have been populated with identifying customer information as a result of scanning a customer ID (e.g., a driver's license). Further, as a result of information being entered in response to both instructions, the progress trigger 310 now indicates that the graphical user interface 300 can move forward to the next screen.

Figure 3C:
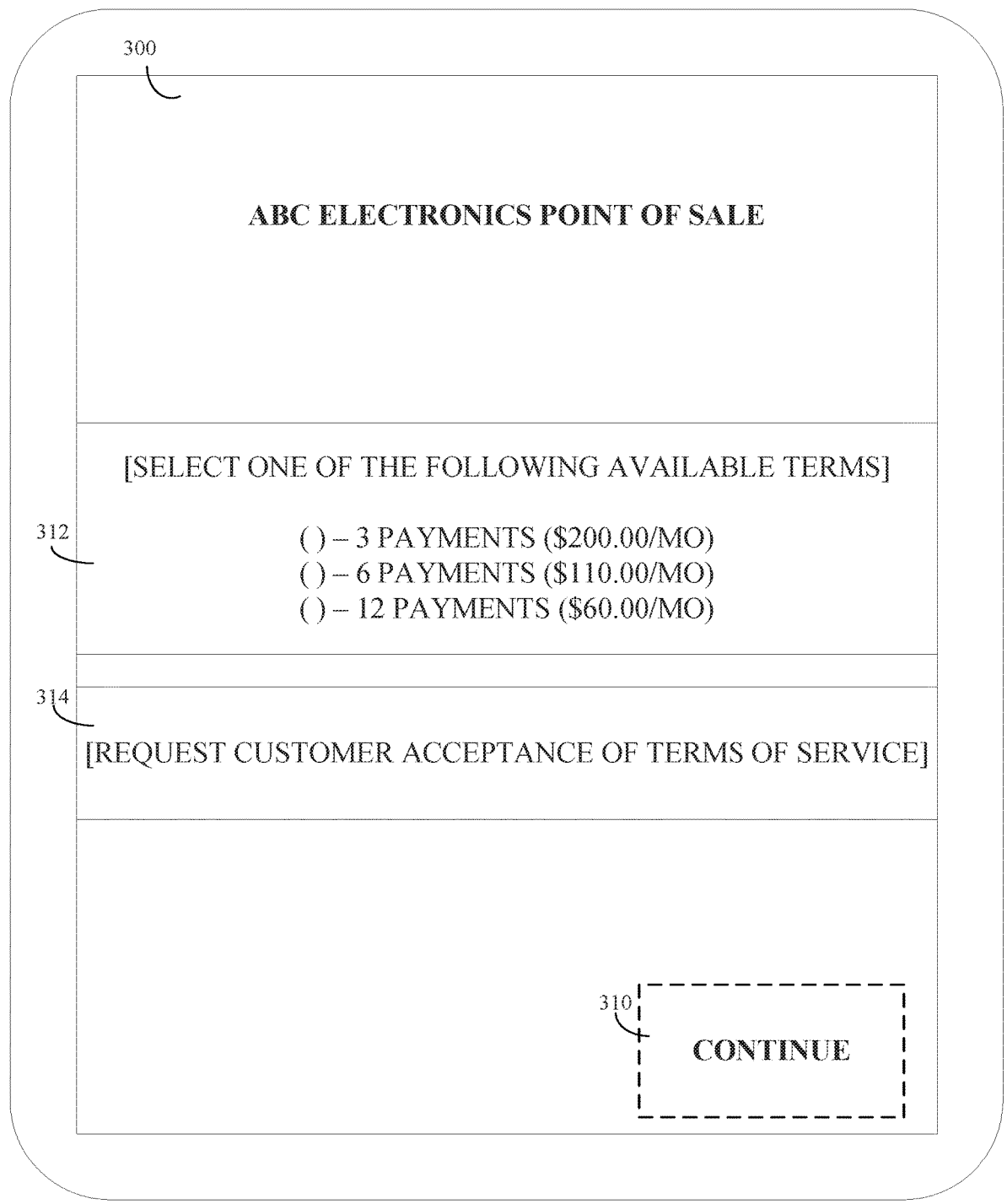
FIG. 3C is another illustrative diagram of a user interface on a point of sale of FIG. 3A according to an example embodiment.

Referring now to FIG. 3C, the graphical user interface 300 has been updated to show a third instruction 312 and a fourth instruction 314, to reflect microloan options that are available to the customer. During the progression of the graphical user interface 300 from the screen shown in FIG. 3B to the screen shown in FIG. 3C, the point of sale associated with the display 214 transmitted the product information and data from the customer information fields 308 to a microloan computing system (e.g., microloan computing system 101) over a network (e.g., network 109). The microloan computing system compiled information from customer data sources (e.g., customer data source 107, financial institution computing system 105), to run a risk assessment based on the customer and the identified product and generate the microloan options shown with respect to the third instruction 312.

The third instruction 312 informs the point of sale user of the microloan options that are available to the customer, including the microloan payment term and the amount of each payment, and instructs the user to input the customer's desired microloan option. The fourth instruction 314 instructs the user to ask the customer to review and accept the microloan terms. The microloan terms can be made available to the customer by, for example, providing the customer with a hard copy document, or by presenting a display containing the terms of agreement to the customer (e.g., on the same display 214 showing the graphical user interface 300, or on a separate display). The customer can accept the microloan terms by, for example, selecting a corresponding progress trigger on an input device (e.g., a separate touchscreen interface at the point of sale), or by verbally communicating consent to the terms to the point of sale user, or by signing a hard copy document containing the microloan terms, or in some arrangements, entering a customer's debit card information into the point of sale. Upon entering the customer's desired microloan option and the customer's consent into the point of sale in response to the third instruction 312 and the fourth instruction 314, the progress trigger 310 can again indicate that the subsequent screen of the graphical user interface is available.

Figure 3D:
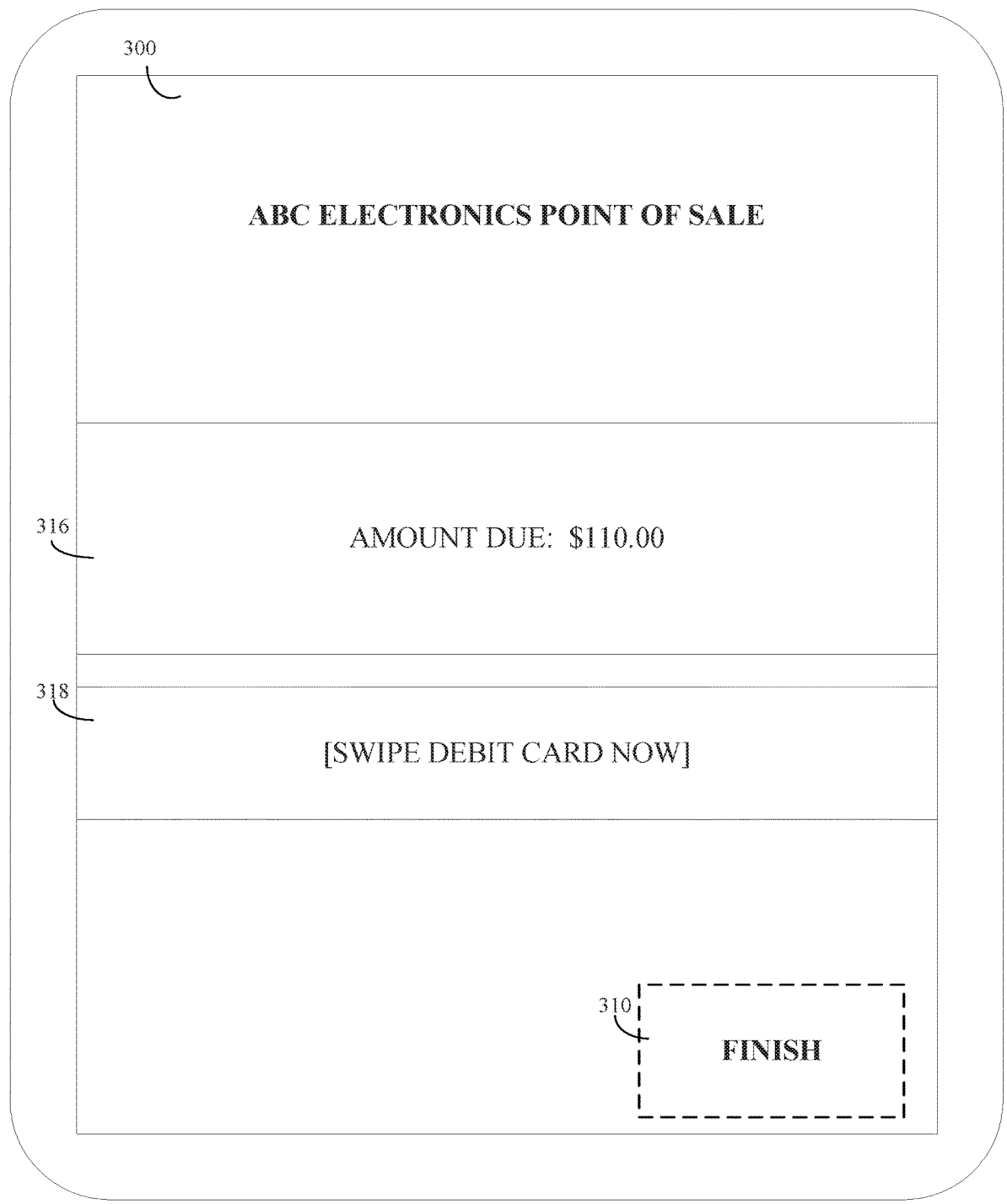
FIG. 3D is another illustrative diagram of a user interface on a point of sale of FIG. 3A according to an example embodiment.

Referring now to FIG. 3D, the graphical user interface 300 has again updated to show a fifth instruction 316 and a sixth instruction 318. In this particular arrangement, a first payment is required before the microloan will issue, as shown by the fifth instruction 216. In addition, the sixth instruction 318 indicates that the only method of payment available to cause the microloan to issue is a debit card. If the customer is able to provide a debit card associated with a checking account containing a balance sufficient to make the first payment per the fifth instruction 216, the user will be able to complete the transaction by acting on the final progress trigger 310. At which point, the microloan computing system that issued the loan will cause a payment in full to issue to the vendor associated with the point of sale, and the microloan computing system will cause monthly payments to issue from the checking account associated with the debit card per the terms of the customer's chosen microloan.

Figure 4:
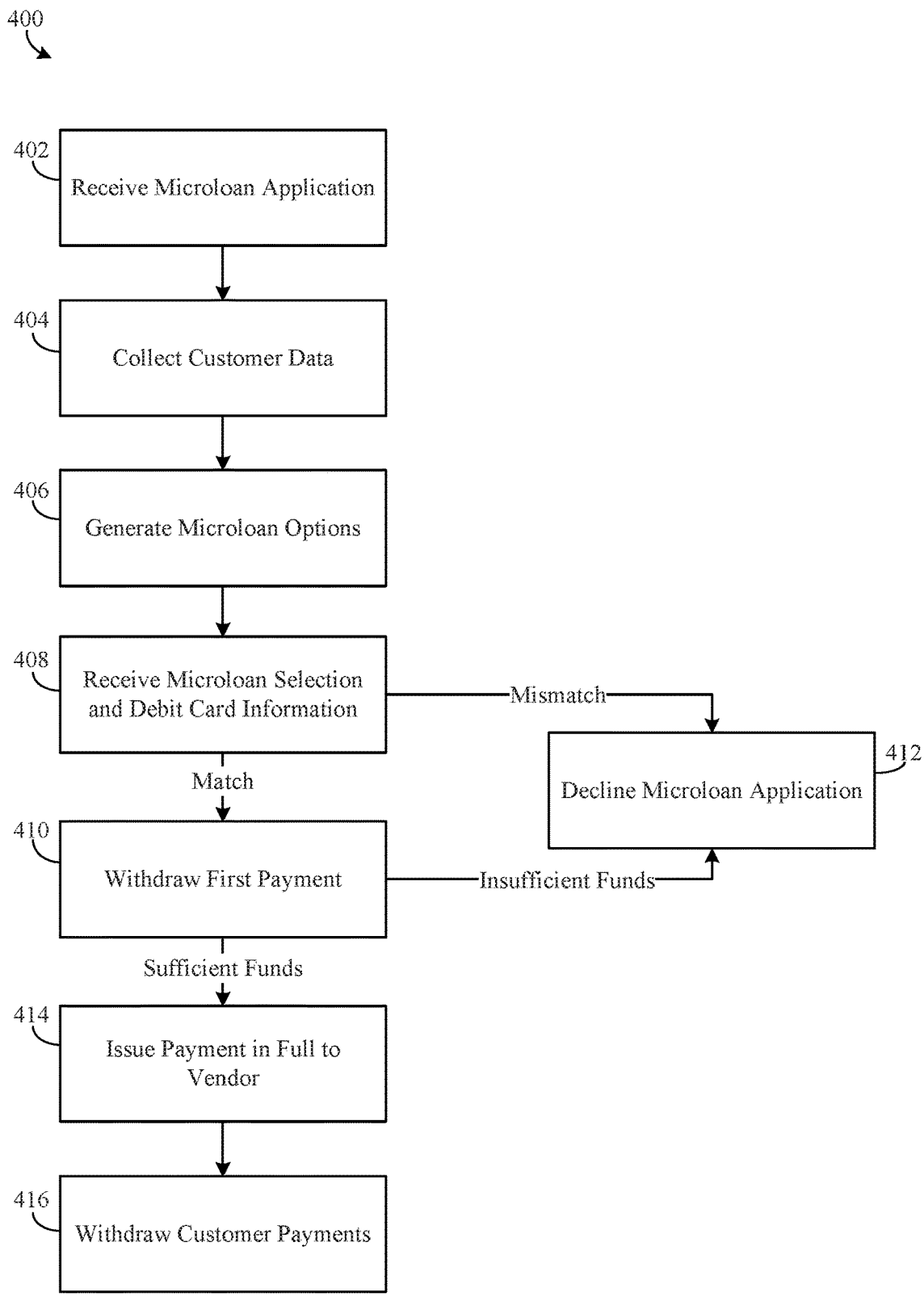
FIG. 4 is a flow diagram of a method of providing debit-based microloan financing according to an example embodiment.

Referring now to FIG. 4, a flow diagram of a method 400 of providing microloans at points of sale is shown according to an example embodiment. The method 400 is performed by a computing system or a network of computing systems associated with a microloan servicer (e.g., microloan computing system 101) configured to underwrite microloan applications and issue and service microloans. As discussed above with respect to the systems discussed with respect to the embodiments shown in FIGS. 1 through 3D, and in further detail below with respect to method 400, the computing system enables an efficient method of assessing risk and providing microloans at the time of purchase.

At 402, a microloan application is received. The microloan application is received by a microloan processing logic (e.g., microloan processing logic 202) at the microloan computing system. The microloan application is a request on behalf of a vendor's customer for a microloan to purchase a good or service and includes identifying customer information (e.g., name, address, phone number, and so on) and the cost of the subject good or service. The microloan application can be generated by a point of sale (e.g., point of sale 103), where a user can enter the customer identifying information and cost information into the point of sale by, for example, using an input device (e.g., input device 216) in the form of a keyboard, mouse, touchscreen, barcode scanner, PDF417 scanner, QR scanner, or the like. In some arrangements, the user can create a digital image of a customer identification card by, for example, capturing an image of the card with a digital camera, or capturing an image of the card with a scanner. In some such arrangements, a text recognition program (e.g., using optical character recognition software at the point of sale) is used to identify and extract identifying customer information from the digital image.

In some arrangements, the point of sale transmits the microloan application and the microloan computing system remotely receives the application over a network (e.g., network 109). In such an arrangement, the microloan computing system can received the microloan application from the network through a network interface logic (e.g., first network interface logic 204). In other arrangements, the microloan computing system is integrated with or in local communication with the point of sale, such that the microloan computing system can locally receive the microloan application. In such arrangements, the microloan computing system can receive the microloan application through any of a variety of data transmission cables or local wireless transmission devices, such as USB cables, serial data cables, Bluetooth™ connections, laser data transmission devices, and so on. In other such arrangements where a single computing system includes both the point of sale and the microloan computing system, the microloan computing system can receive microloan applications directly from a user.

At 404, customer data is collected by the microloan processing logic. Customer data includes financial and/or personal information relevant to determining the risk of issuing a microloan to the individual identified in the microloan application. Such customer data can include, for example, credit history and reports, number of accounts, account balances, judgments involving cash or assets, and so on. Customer data can be collected from one or several customer data sources (e.g., customer data source 107), which may include, for example, services provided by Microbilt Corp. or Lexis-Nexis™, financial institutions (including financial institutions maintaining at least one account for the customer), and the like.

In some arrangements, the microloan processing logic can collect customer data over a network via the network interface logic. In other arrangements, the microloan computing system is integrated with or in local communication with a financial institution computing system (e.g., financial institution computing system 105) or one of the data sources, and as such, the microloan processing logic may collect customer data on a local level.

At 406, microloan options are generated by the microloan processing logic. Microloan options are sets of microloan terms, where each set defines a repayment plan involving cash payments over a length of time. Microloan terms can include, for example, a principal value, an interest rate, a number of payments to be made, and a time interval separating each payment (e.g., a principal of $1,000 at 8% interest with payments set for the fifteenth of every other month for eight months). The microloan terms are determined by a risk assessment of issuing a microloan to the customer identified in the microloan application. As such, in some arrangements, the microloan terms can be generated such that increasing interest rates and decreasing repayment time periods are associated with increasing levels of risk. In some arrangements where the risk assessment includes a risk score, levels of risk and therefore appropriate microloan terms can be determined from the risk score.

The microloan processing logic can generate the risk assessment for a given microloan applicant from the customer data received at 404. In some arrangements, the risk assessment can be generated by applying the received customer data to a series of decision trees (e.g., as discussed with respect to the microloan processing logic 202 of FIG. 2, above). The outcome of a given series of decision trees, such as a risk score, can be used as in indicator of risk and appropriate microloan terms can be generated for the risk level indicated.

In some arrangements, the microloan processing logic receives debit card information associated with a checking or other account before the microloan options are generated at 406. Accordingly, the debit card information, such as the user's name, account number, can be verified. For example, the existence of the account can be verified and that the account holder's name matches the user's name from the debit card information. In some such arrangements, the microloan processing logic attempts to withdraw a first payment from the account associated with the debit card information as part of the risk assessment. As such, if the attempted first payment fails for insufficient funds in the corresponding account, the microloan processing logic can be configured to detect an increased amount of risk and, in one arrangement, cause a corresponding risk score to increase. If the first payment is successful, the microloan processing logic can be configured to detect a decreased amount of risk and, in one arrangement, cause a corresponding risk score to decrease. In these arrangements, the microloan processing logic can be configured to subsequently adjust the microloan options generated to reflect the adjustments to the risk score.

At 408, a customer's microloan selection and debit card information is received by the microloan processing logic. Debit card information includes information sufficient to allow funds to be drawn from a checking account or other account associated with the customer identified in the microloan application. In some arrangements, the debit card information received further includes a customer authorization to draw funds from the account according to the terms of the customer's selected microloan option. The debit card information may be received as a result of a physical debit card being swiped at the point of sale (e.g., a card reader), a debit account number being manually entered at the point of sale (e.g., a keyboard), or an electronic transmission to the microloan computing system (e.g., via a data transfer from a customer mobile device), among other similar avenues of data entry and transmission.

In one arrangement, if the debit card information received does not match the identifying information in the microloan application received at 402, the microloan application is declined at 412. The debit card information received may not match the identifying customer information in the microloan application because, for example, the customer is attempting to set up the microloan with an unauthorized debit card, or with a debit card associated with another individual. In the event of such a mismatch, the microloan application may be denied because the risk assessment used to generate the microloan options may not be relevant to the individual associated with the actual checking account that would have been used to service the microloan.

At 410, the microloan processing logic authorizes a first payment to be withdrawn. A first payment pursuant to the customer's selected microloan option is withdrawn from the checking account or other account associated with the debit card information received at 408. In some arrangements, the first payment amount is similar to remaining payments in the selected microloan, and may serve as the date upon which future payment due dates are based (e.g., the second payment is due one month from the date of first payment). In other arrangements, the first payment amount is different from the remaining payments of the selected microloan option, for example where the first payment serves as a larger down payment on the microloan relative to the remaining payments.

In one arrangement, if the checking account associated with the debit card information received does not have sufficient funds to withdraw for the first payment, the microloan application can be declined at 412. In some such arrangements where account balances are not retrieved at 406, verifying a minimum balance sufficient to pay for the first payment (e.g., in the form of a notification of a successful or a failed first transaction at the point of sale) may be a part of a continuing risk assessment for a given microloan option.

Further, in one arrangement, in the event of a successful first payment, the microloan processing logic can receive a first payment confirmation and a signed microloan agreement executed by the corresponding customer, and may further receive the customer's contact information (e.g., mailing address, phone number, e-mail address, or the like). In some such arrangements, the microloan processing logic can be configured to store the microloan and customer information in a microloan database. The microloan processing logic may also be configured to provide the customer with a system for monitoring or tracking the progress or status of the microloan (e.g., by updating a website corresponding to the microloan servicer and providing the customer with unique login credentials to access the microloan information stored on the microloan database).

At 414, the microloan processing logic causes a payment in full to issue to the vendor. Upon a successful processing of a microloan application and issuing of a corresponding microloan, the microloan processing logic issues a payment in full for the microloan amount to the vendor of the subject good or service. As such, in an arrangement where the microloan computing system is a third party to the vendor at the point of sale, the vendor can be paid in full from a financial account associated with the microloan computing system and the customer can take immediate possession of the subject good or be immediately entitled to the subject service. In an arrangement where the microloan computing system is itself associated with the vendor at the point of sale, the vendor can simply grant immediate possession or entitlement of the good or service to the customer, and the microloan computing system can maintain a record of the new microloan balance (i.e., no actual transfer of a payment corresponding to the full microloan value, as the microloan servicer and the vendor is one and the same).

At 416, the microloan processing logic causes payments to be withdrawn from the customer checking account or other account associated with the debit card information received at 406. The payments are withdrawn in accordance with the customer's selected microloan option. As such, if the chosen microloan entails three monthly payments of $100.00 on the first of each month, the microloan processing logic causes transactions according to that value, date, and frequency to occur.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and tables in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable or non-transitory storage media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of executable instructions or associated data structures represents examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable customer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A microloan computing system comprising:
a point of sale computing system;
an image capture device comprising at least one of a scanner and a digital camera, the image capture device communicatively coupled to the point of sale computing system;
a network interface logic that performs operation comprising access and exchange data over a network; and
a microloan processing logic that performs operations comprising:
scan, by the image capture device, the customer identification card of a customer;
generate, by the image capture device, a digital image of the customer identification card;
extract, by the point of sale computing system, identifying customer information from the digital image of the customer identification card, comprising perform, by the point of sale computing system, optical character (OCR) recognition operations on the digital image;
receive a microloan application, by the point of sale computing system, including the identifying customer information of and a loan amount;
collect customer data relating to the customer from at least one customer data source;
generate at least one microloan option containing microloan terms based on the customer data and the loan amount;
receive debit card information corresponding to an account at a financial institution, by the point of sale computing system, to be used for providing payments pursuant to a selected microloan option;
determine that the debit card information matches the identifying customer information;
authorize a microloan based on the selected microloan option to issue; and
display a final approval of the microloan by the point of sale computing system.

2. The system of claim 1, further comprising a microloan database configured to store information relating to issued microloans, wherein the microloan processing logic is further configured to service at least one issued microloan stored in the microloan database by authorizing funds in a corresponding account at a financial institution to be withdrawn in accordance with the terms of the microloan.

3. The system of claim 1, wherein the microloan processing logic is further configured to perform a risk assessment based on the customer data wherein the risk assessment includes a calculated risk score; and the microloan processing logic is further configured to perform basing the at least one microloan option on the risk assessment.

4. The system of claim 3, wherein the microloan processing logic is further configured to generate a shorter repayment period for customers with risk scores indicating a higher level of risk compared to customers with risk scores indicating a lower level of risk.

5. The system of claim 3, wherein the microloan processing logic is further configured to generate fewer payment intervals for customers with risk scores indicating a higher level of risk compared to customers with risk scores indicating a lower level of risk.

6. The system of claim 3, wherein the microloan terms include an interest rate, such that higher interest rates are generated for higher risk customers and lower interest rates are generated for lower risk customers, the risk of each customer being determined by the risk assessment.

7. The system of claim 3, wherein the microloan processing logic is further configured to compare the identifying customer information with the debit card information; and the microloan processing logic is further configured to identify from the risk score a higher level of risk when the identifying customer information is inconsistent with the debit card information, and identify a lower level of risk when the identifying customer information is consistent with the debit card information.

8. The system of claim 3, wherein the microloan processing logic is further configured to authorize a first payment from the account at a financial institution prior to issuing a microloan; and the microloan processing logic is further configured to identify from the risk score a higher level of risk when the account has insufficient funds for the first payment, and identify a lower level of risk when the account has sufficient funds for the first payment.

9. The system of claim 8, wherein the microloan processing logic is further configured to receive a signed agreement from the customer for the selected microloan option, wherein the signed agreement is received after a successful first payment from the account and before the microloan is issued.

10. The system of claim 8, wherein the microloan processing logic is further configured to receive debit card information associated with an alternative account after a failed first payment from the account.

11. The system of claim 1, wherein the microloan computing system is locally integrated with a point of sale computing system.

12. A computer implemented method of processing microloans, the method comprising:
communicating, by a microloan processing logic, with one of a scanner and a digital camera communicatively coupled to a point of sale computing system, computer-executable instructions to generate a digital image of a customer identification card of a customer, generating the digital image comprising scanning the customer identification card;
communicating, by the microloan processing logic, with the point of sale computing system, computer-executable instructions to extract identifying customer information from the digital image of the customer identification card, comprising computer-executable instructions to perform, by the point of sale computing system, optical character (OCR) recognition operations on the digital image;
receiving, by the microloan processing logic and from the point of sale computing system, a microloan application including the identifying customer information and a loan amount;
collecting, by the microloan processing logic, customer data relating to the customer from at least one customer data source;
generating, by the microloan processing logic, at least one microloan option containing microloan terms based on the customer data and the loan amount;
receiving, by the microloan processing logic and from the point of sale computing system, debit card information corresponding to an account at a financial institution to be used for providing payments pursuant to a selected microloan option;
confirming, by the microloan processing logic, that the debit card information corresponds to the identifying customer information;
authorizing, by the microloan processing logic, a microloan based on the selected microloan option to issue; and
transmitting, by the microloan processing logic, a final approval of the microloan to the point of sale computing system.

13. The method of claim 12, further comprising performing, by the microloan processing logic, a risk assessment based on the customer data wherein the risk assessment includes a calculated risk score; and further comprising performing, by the microloan processing logic, basing the at least one microloan option on the risk assessment.

14. The method of claim 13, further comprising comparing, by the microloan processing logic, the identifying customer information with the debit card information; and further comprising identifying, by the microloan processing logic, a higher level of risk when the identifying customer information is inconsistent with the debit card information, and identifying a lower level of risk when the identifying customer information is consistent with the debit card information.

15. A non-transitory computer readable medium having computer-executable instructions embodied therein that, when executed by at least one processor of a microloan computing system, cause the microloan computing system to perform operations to process microloans for the purchase of goods or services, the operations comprising:
communicate, by a microloan processing logic, with one of a scanner and a digital camera communicatively coupled to a point of sale computing system, computer-executable instructions to generate a digital image of a customer identification card of a customer, generating the digital image comprising scanning the customer identification card;
communicate, by the microloan processing logic, with the point of sale computing system, computer-executable instructions to extract identifying customer information from the digital image of the customer identification card, comprising computer-executable instructions to perform, by the point of sale computing system, optical character (OCR) recognition operations on the digital image;
receive, from the point of sale computing system, a microloan application including the identifying customer information and a loan amount;
collect customer data relating to the customer from at least one customer data source;
generate at least one microloan option containing microloan terms based on the customer data and the loan amount;
receive debit card information corresponding to an account at a financial institution, from the point of sale computing system, to be used for providing payments pursuant to a selected microloan option;
confirm that the debit card information corresponds to the identifying customer information;
authorize a microloan based on the selected microloan option to issue; and
transmit a final approval of the microloan to the point of sale computing system.

16. The medium of claim 15, the operations further comprising perform a risk assessment based on the customer data wherein the risk assessment includes a calculated risk score; and further comprising perform base the at least one microloan option on the risk assessment.

17. The medium of claim 16, the operations further comprising compare the identifying customer information with the debit card information; and the operations further comprising identify a higher level of risk when the identifying customer information is inconsistent with the debit card information, and identify a lower level of risk when the identifying customer information is consistent with the debit card information.

* * * * *